United States Patent
Possati

Patent Number: 5,113,592
Date of Patent: May 19, 1992

[54] MASTER PART AND RELEVANT MANUFACTURING PROCESS

[75] Inventor: Mario Possati, Bologna, Italy

[73] Assignee: Marposs Societa' per Azioni, S. Marino di Bentivoglio, Italy

[21] Appl. No.: 548,875

[22] PCT Filed: Mar. 22, 1989

[86] PCT No.: PCT/EP89/00314

§ 371 Date: Jul. 24, 1990

§ 102(e) Date: Jul. 24, 1990

[87] PCT Pub. No.: WO89/10530

PCT Pub. Date: Nov. 2, 1989

[30] Foreign Application Priority Data

Apr. 21, 1988 [IT] Italy ............... 3423A/88

[51] Int. Cl.⁵ .................................. G01B 3/30
[52] U.S. Cl. .......................... 33/567.1; 33/605; 33/545; 33/567
[58] Field of Search .......... 33/567, 567.1, 545, 33/605, 562, 502

[56] References Cited

U.S. PATENT DOCUMENTS

| | | | |
|---|---|---|---|
| 1,308,493 | 7/1919 | Jaques, Jr. | 33/562 |
| 1,362,726 | 12/1920 | Mason | 33/562 |
| 2,039,141 | 4/1936 | Brault | 33/567 |
| 2,537,340 | 1/1951 | Fonda | 33/567 |
| 2,725,636 | 12/1955 | Green | 33/502 |
| 2,831,256 | 4/1958 | Werle | 33/567 |
| 3,845,560 | 11/1974 | Sommer | 33/567 |
| 3,861,049 | 1/1975 | Muller | 33/562 |
| 4,578,875 | 4/1986 | Vertin | 33/562 |

FOREIGN PATENT DOCUMENTS

| | | |
|---|---|---|
| 2320918 | 11/1974 | Fed. Rep. of Germany . |
| 2248487 | 5/1975 | France . |
| WO8404720 | 12/1984 | PCT Int'l Appl. . |
| 308630 | 10/1955 | Switzerland . |
| 1565061 | 4/1980 | United Kingdom . |
| 2036328 | 6/1980 | United Kingdom . |

*Primary Examiner*—Thomas B. Will
*Attorney, Agent, or Firm*—Stevens, Davis, Miller & Mosher

[57] ABSTRACT

A reference master part for linear dimensions and/or geometrical and/or shape features of determined workpieces (30) comprises precision-machined surfaces having mutual spatial arrangements such as to provide known references for said dimensions, etc. For simplifying the manufacturing processes and reducing the costs, the master part is made of a support body (1; 31) of ordinary material, reference elements (7, 8; 41–46, 50, 51, 54–57, 63, 64, 70, 71), of special material for master parts, fixed in corresponding seats (4; 33–38, 58–60) of the support body, and supporting and guiding elements (63, 64, 70, 71), made of special material, fixed to the support body. During the master part manufacturing, the reference elements are adjusted and then fixed in the relevant seats.

15 Claims, 2 Drawing Sheets

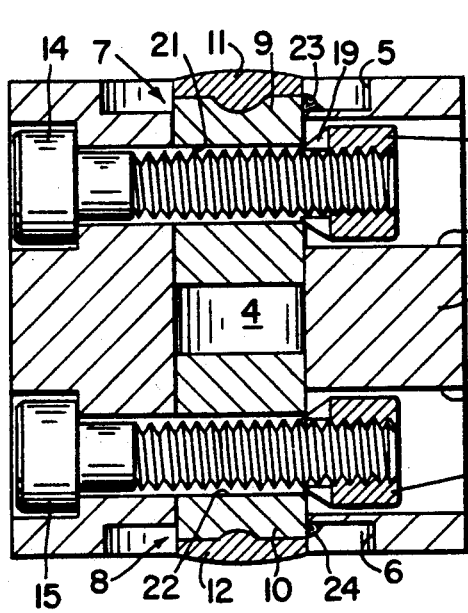
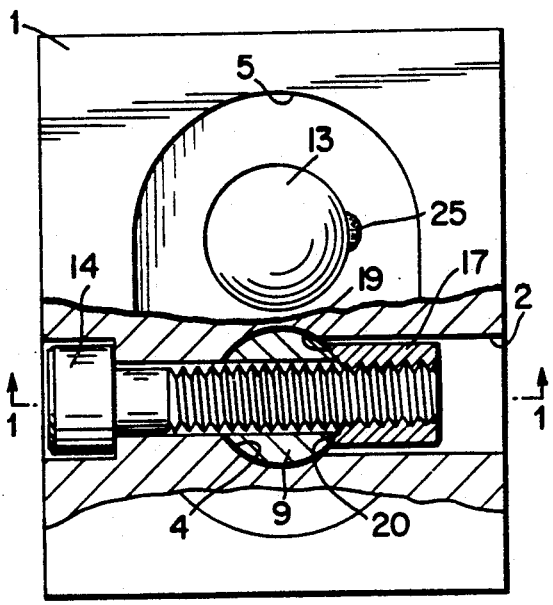
Fig.1  Fig.2
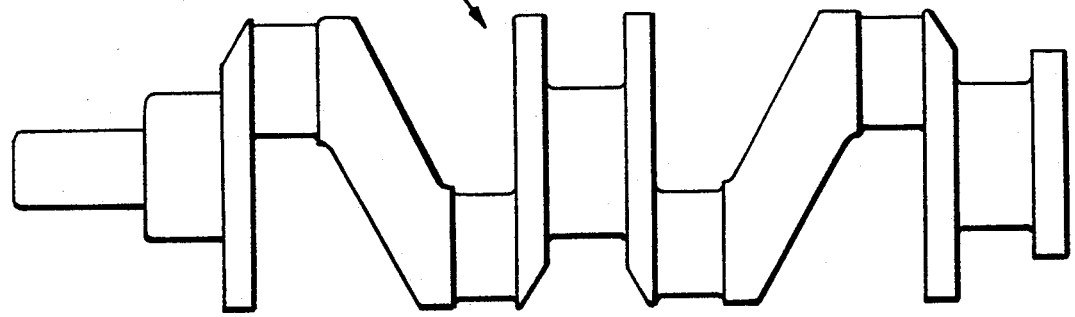
Fig.3
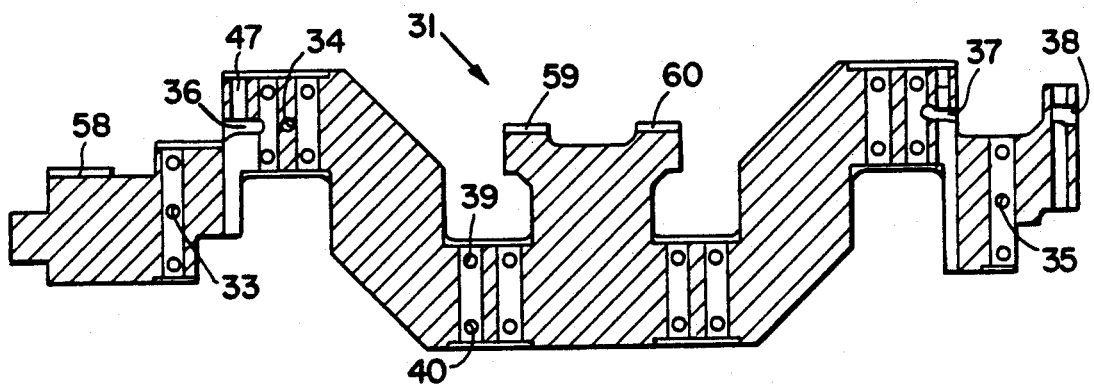
Fig.4

MASTER PART AND RELEVANT MANUFACTURING PROCESS

TECHNICAL FIELD

The invention relates to a master part with a plurality of reference or datum zones for determined workpieces, these zones including precision machined surfaces having pre-established mutual spatial arrangements.

The invention also relates to a process for manufacturing said master part.

BACKGROUND ART

As it is known, the processes for manufacturing and inspecting workpieces involve the use of master parts adapted to provide datums or references for the critical features or surfaces of the workpieces, in particular for linear dimensions, shape and geometry features, etc.

In particular, these master parts are necessary for zero-setting devices and machines used for checking, through comparative measurements, said features of the workpieces during the different steps and at the end of the mechanical machining operations relating to the same workpieces.

The known master parts are manufactured through precision, chip-forming machining operations, on blocks of special steel for master parts, at least as far as the surfaces corresponding to the critical surfaces of the workpieces are concerned. After the mechanical machinings, the master part undergoes hardening and annealing heat treatments.

The material of the conventional master pats is characterized by very high hardness and stability and therefore this material is "special" for both intrinsic chemical features and the hardening and annealing treatments.

These master parts have conceptually monolithic, i.e. integral structure, even if sometimes—due to accessibility problems or other practical difficulties—, especially in the case of very complex master parts, this structure is comprised of a plurality of blocks.

In order to preserve the master parts from corrosion, often on them there are applied, before the finishing machinings and the final heat treatments, chromium or nickel platings, or platings with other anticorrosive materials. This renders the finishing (grinding, lapping, etc.) machinings more difficult and expensive, in particular with regard to the reference surfaces, where consequently these platings are not always applied. In this case, the reference surfaces must periodically be greased.

Moreover, the master parts are subjected to a certification procedure in a metrology department, by means of measuring apparatuses having a very high accuracy. This procedure is basically distinct from the manufacturing process.

The manufacturing of a conventional master part is very complex and expensive, since, among other things, a machining error may cause the rejection of the entire master part or of a substantial part of it. Besides, the manufacturing process has a very poor or null flexibility, because the major part of it is specific for a determined workpiece.

Usually, the shape of the master parts is rather similar to that of the relevant workpieces, especially as far as the critical surfaces of the workpieces are concerned.

As it is known, even if the workpieces have to be dynamically checked (for example, in the case of shafts, during rotation about their geometrical axis), the master parts are used in a static way, by using as references only a minor portion of the precision machined surfaces or zones. Thus, for example, when cylindrical surfaces providing references or datums for corresponding workpiece surfaces are concerned, two or four points or zones of these surfaces of the master part are used, to define one or, respectively, two diameters.

DISCLOSURE OF INVENTION

Object of the invention is to simplify the manufacturing method used for the known master parts by obtaining, through cheaper processes and materials, master parts that eliminate many drawbacks, while guaranteeing high accuracies and stability.

The invention, as characterized in the claims, makes it possible to diminish the intrinsic cost of the materials and to reduce, even for very complex master parts, the precision machinings and the hardening and stabilization treatments.

The support structure or body of the master part can be made of cheap materials having a hardness not particularly high, but that guarantee high shape stability, due to the absence of considerable internal stresses.

Therefore, these materials can be called "normal" or "ordinary" in contrast with those previously indicated as "special", because—due to their intrinsic chemical features and/or the absence (or impossibility) of hardening treatments—their final hardness is considerably lower than that (i.e. after hardening and stabilization) of the special materials. For example, the Brinell hardness values can be of 100 and 600 $Kg/mm^2$, respectively.

The machining of the support structure is simplified and expensive heat treatments are not necessary for it.

The reference elements, and possible supporting and guiding elements, can be separately machined and treated and thereafter fixed to the support structure.

The invention provides considerable advantages with respect to corrosion prevention, too, because this problem can be separately solved for the support body and the reference elements.

The master gauges according to the invention have, at least partially, a modular construction, because the reference elements can have, within certain limits, shape and sizes independent from the specific workpiece. Moreover, by maintaining unchanged or slightly modifying the support body and by suitably adjusting and then locking the reference elements, manufacturing flexibility is obtained, since it is possible to make, with substantially equal mechanical parts, reference master gauges for similar workpieces having some sizes or dimensions, within certain limits, different.

The manufacturing flexibility can also be advantageous in the frequent cases when two reference master parts—relating to the upper and lower tolerance limits—are requested for the checking of the same workpiece.

Another advantage resides in the reduction of the accessibility problems often arising in the manufacturing of conventional master parts, since the precision machining operations can be limited to the reference elements, when they are not yet coupled with the support body or structure.

Therefore it is generally possible and convenient obtaining (through mechanical machinings with material removal, or through casting) the support structure as an integral body and machining the reference elements without particular difficulties.

The reference elements can be obtained by coupling support portions, made for example of special steel, with inserts made of different material (diamond, sintered carbides, ceramics, ruby, etc). This is also advantageous for preventing corrosion on the contact surface, since anticorrosive material may be used for the inserts only.

While the dimensions of the conventional master parts usually do not coincide with the nominal ones of the workpieces, but feature known (although, of course, limited) deviations with respect to them, in accordance with the present invention it is possible to make master parts having dimensions equal to the nominal ones.

The certification of the master parts according to the present invention becomes integral part of the manufacturing process, since it is carried out during the phases of adjusting and fixing the reference elements.

The master parts according to the invention, due to their structure and manufacturing, can have a shape very different from that of the relevant workpieces. As a matter of fact, in the master parts there are not completely reproduced the critical surfaces of the workpieces, but only limited zones of them. This provides an advantage with respect to the machining economy.

Another advantage consists in that while the technologies for manufacturing the conventional master parts are so complex as to render necessary the resort to specialized suppliers, the master parts according to the invention can be manufactured by the same makers of the measuring machine in which it is intended to use the master part. Therefore, further benefits with regard to costs and reduction of the manufacturing times are obtained.

An additional advantage, for the manufacturer or user of workpieces featuring confidentiality character (because of high technology and not yet introduced into the market, or for other reasons), arises on the one hand from the increased possibility of "disguising" the master part with possibility of reducing the number of suppliers.

BRIEF DESCRIPTION OF DRAWINGS

The invention will be described in detail with reference to a preferred embodiment, illustrated for two different applications.

FIG. 1 is a cross-section, along the plane indicated by path I—I in FIG. 2, of a master part adapted to define two reference lengths or diameters;

FIG. 2 is a partially sectioned plan view of the master part of FIG. 1;

FIG. 3 is an outline of a crankshaft, that constitutes the workpiece for which a master part has to be manufactured;

FIG. 4 is a longitudinal section of the support structure of a master part to be used as reference for the crankshaft of FIG. 3;

BEST MODE FOR CARRYING OUT THE INVENTION

Figure 5:
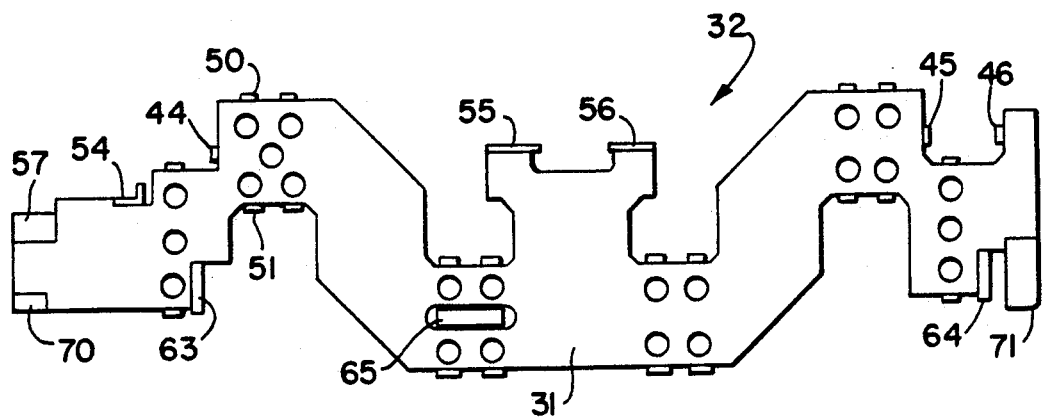
FIG. 5 is a view of a master part comprising the support structure of FIG. 4 and reference elements of the master part.

The master part of FIGS. 1 and 2 comprises a support structure constituted by an integral body 1 obtained by forging, casting and/or chip-forming mechanical machinings on a material such as ordinary steel for casting, or cast iron, without particular subsequent hardening and annealing heat treatments. The mechanical machinings can usually be of not high precision (e.g. milling, drilling, etc.).

The body 1, having roughly a parallelepiped on shape, defines four transversal holes with cylindrical walls of different diameters, and two seats constituted by longitudinal holes; two transversal holes 2, 3 and one longitudinal hole 4 are visible in FIG. 1.

Moreover, in correspondence with the upper and lower faces of body 1 there are defined recesses 5, 6 where the longitudinal holes 4 end.

Inserted within each of the longitudinal holes 4, with small transversal play, is a pair of reference or datum elements, two of which, 7 and 8, are visible in FIG. 1. Reference elements 7 and 8 comprise support portions constituted by substantially cylindrical elements 9, 10, at whose ends there are secured, by an adhesive, inserts 11, 12. Another insert 13 is visible in FIG. 2.

Cylindrical elements 9, 10 are made of a material for master parts, such as hard steel, and are subjected, after machining, to quenching and stabilization. The inserts 11, 12, 13 are made of a material different from that of cylindrical elements 9, 10, for example diamond, sintered carbides, ceramics, ruby, etc.

The ends of inserts 11, 12, 13 define reference or contact zones provided for cooperating with the feelers of measuring machines or benches adapted to check diameters or distances between two pairs of points of workpieces having nominal values of these diameters or distances corresponding to the distances between the ends of the pairs of inserts 11, 12, 13.

For obtaining a correct contact with said feelers, the ends of inserts 11, 12, 13 are precision machined, with suitable radius of curvature.

The reference elements can also be obtained by integral elements, without inserts, and in this case it may be particularly useful to apply on them platings of anticorrosive material, e.g. chromium or nickel, that is then subjected to finishing machinings.

Similar platings can be applied onto integral body 1, but without any need of subsequent material removing finishing machinings.

For securing reference elements 7, 8 to integral body 1, there are foreseen locking means including screw devices constituted by bolts 14, 15 and nuts 17, 18. The inner ends of nuts 17, 18 define flat chamfers 19, 20, visible in FIG. 2, adapted to cooperate with the surface of cylindrical elements 9, 10, in such a way as to clamp portions of the surfaces of these elements 9, 10 against portions of the inner walls of longitudinal holes 4.

The shanks of bolts 14, 15 pass, with suitable play, through holes 21, 22 of elements 9, 10, as well as through transversal holes 2, 3.

Reference elements 7, 8 can be adjusted in the relevant seats 4, by suitable tools, on accurate measuring machines, such as three-coordinate machines In this way, as already mentioned, the distance between the ends of the pairs of inserts 11, 12, 13 can be set to correspond to the nominal dimensions of the workpiece for which the master part is manufactured.

Then reference elements 7, 8 are locked. For guaranteeing a very stable locking, in adjacent zones of reference elements 7, 8 and of body 1 there can be applied adhesives, as indicated by reference numerals 23, 24, 25.

The crankshaft 30 schematically shown in FIG. 3 comprises three main journals and four crank pins. It is assumed that several dimensional and geometrical features have to be checked on a series of these shafts 30, in particular two diameters for each crankpin, longitudinal distances, distances from a geometrical axis, electronically defined with reference to the end main journals, etc. These checkings are of a known type and therefore are not described in detail.

Figure 6:
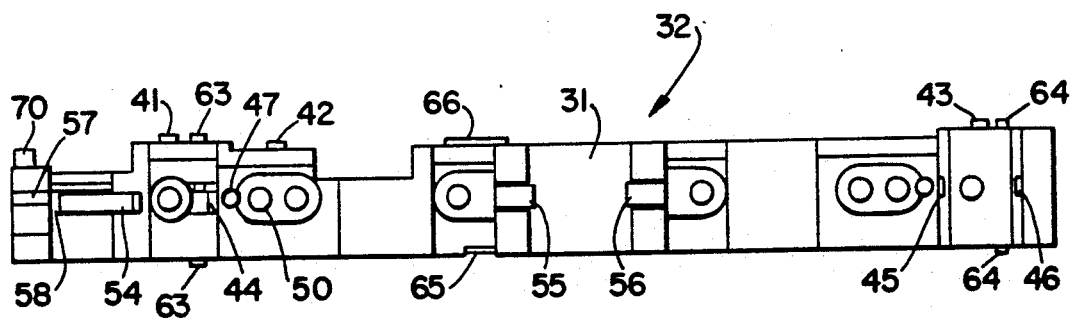
FIG. 6 is a plan view of the master part of FIG. 5.

FIG. 4 is a section of the support structure 31 of a master part 32, shown in FIGS. 5 and 6, adapted for permitting zero setting of the measuring machine provided for checking said series of shafts 30.

Although support structure 31 pertains to a master part 32 for a workpiece 30 including, mostly, cylindrical critical surfaces, it is chiefly characterized by flat surfaces and seats for reference elements and locking devices. The seats are defined by cylindrical surfaces of holes and, as it will appear hereinafter, by flat abutment surfaces. Apart from three holes 33, 34, 35 and three other holes 36, 37, 38, the further holes visible in FIG. 4, for example holes 39, 40, correspond—as to their functions—to transversal holes 2, 3 of FIGS. 1 and 2, namely they are provided for housing locking devices constituted by bolts and nuts.

Holes 33-38, instead, are intended for acting as seats for reference or datum elements 41, 42, 43, 44, 45, 46, visible in FIGS. 5 and/or 6, adapted for defining corresponding points or theoretical dimensions of crankshaft 30; the locking devices for these elements 41-46 are, as usually, housed within other holes, having geometrical axes perpendicular to those of the corresponding holes 33-38. For example, hole 47, visible in FIGS. 4 and 6, communicates for this purpose with hole 36, for the locking of element 44.

The reference elements provided for cooperating with the feelers of the measuring machine comprise, in addition to elements 41-46, pairs of elements, such as the pair 50, 51 visible in FIGS. 5 and 6, adapted for defining predetermined diameters of the crank pins and the main journals of crankshaft 30 along a direction parallel to similar to elements 7, 8 of FIGS. 1 and 2, but are made as integral members (without coupled inserts).

Other reference elements provided for cooperating with the feelers of the measuring machine are denoted by numerals 54, 55, 56 and 57.

Elements 54, 55 and 56, that act as references for longitudinal distances, are housed in grooves 58, 59, 60 having substantially flat walls and partially visible in FIG. 4. Elements 55 and 56 have approximately a parallelepiped on shape, while element 54 has substantially an L-shaped longitudinal section.

Element 57 has its section with a C-like shape and is intended for acting as a reference for a keyslot.

Elements 54, 55, 56 are fixed within the relevant grooves 58, 59, 60 and element 57 onto a surface of structure 31 by screws, not shown.

The proper positioning of master part 32 in the operating position in the measuring machine is obtained through two reference or support elements 63, 64, visible in FIGS. 5 and 6. These elements, that are secured with screws, not visible, define portions of cylindrical surfaces adapted to cooperate with Vee support devices arranged in the machine. Two blocks 65, 66 are also screwed to structure 31 and can cooperate with two abutments of the machine for causing the main longitudinal plane of symmetry of master part 32 to arrange itself in a vertical position.

Fixed by screws to structure 31 are also two guiding elements 70, 71, adapted to guide master part 32 during the insertion into the operating position.

Reference elements 41-46, 50, 51, 54-57, that define zones or points corresponding to dimensions or distances of the workpiece, the elements 63, 64—for resting upon external reference elements—and guiding elements 70, 71 are made of special steel for master parts through precision machinings, hardening and annealing treatments and with possible platings of chromium, nickel or other materials resistant to corrosion.

Structure 31 can be made of ordinary steel, much less harder than that of reference elements, without high precision machinings or complex heat treatments.

As a matter of fact, for the master part precision, it is relied on the finish of the reference elements and the possibility of adjusting in the corresponding seats the reference elements provided for cooperating with the feelers of the measuring machine. The adjustment can be made along the critical directions (along directions corresponding to the radial ones of crankshaft 30 for reference elements relating to diameter values and along the longitudinal direction for reference elements relating to longitudinal sizes and distances). This adjustment can be performed with great accuracy by coordinate measuring machines featuring adequate measuring accuracy.

Therefore, the effect of a not highly accurate machining of the seats for the reference elements can be limited to second order errors, that are sufficiently small.

What matters, as to reference elements 63, 64, is not the accuracy of the position of their cylindrical surfaces with respect to structure 31, but the spatial arrangement of the reference elements provided for cooperating with the feelers of the measuring machine with respect to the geometrical axis defined through the contact of the same elements 63, 64 on the Vee support devices.

For the master part 32 of FIGS. 4 to 6, too, the fixing of reference elements can be rendered stable by using adhesives. In case of damage of a reference element, the coupling due to the relevant adhesive can be chemically or mechanically dissolved and, after having unlocked the corresponding locking device, it is possible to apply a new reference element, without having to get rid of the whole master part, as may happen for the conventional master parts.

I claim:

1. A master part for determined workpieces (30) defining a plurality of critical features, such as linear dimensions, and shape and geometry features, relating to a three dimensional space, comprising:
    a substantially three dimensional support structure (1; 31) in ordinary material, the support structure defining a multiplicity of seats (4; 33-38; 58-60);
    a multiplicity of individual reference elements (7, 8; 41-46, 50, 51, 54-57, 63, 70, 71) in special material for master parts, the reference elements defining a corresponding multiplicity of precision machined surfaces (11-13) and being adjustably arranged in said seats along directions corresponding to variations of said critical features; and
    locking devices (14, 15, 17, 18, 23-35) for locking the reference elements in the seats to determine a three dimensional arrangement of said precision machined surfaces corresponding to a determined spatial arrangement of said critical features.

2. A master part according to claim 1, wherein said reference elements comprise support elements (63, 64) for arranging the master part on external reference devices.

3. A master part according to claim 1, wherein said reference elements comprise guiding elements (70, 71)

for the insertion of the master part into the operating position.

4. A master part according to claim 1, wherein said locking devices comprise screw locking devices (14, 15, 17, 18).

5. A master part according to claim 4, wherein said locking devices comprise adhesives (23-25) for stably locking the reference elements within the corresponding seats.

6. A master part according to claim 1, wherein said support structure (1; 31) defines holes (4; 33-38) with circular cross-sections, that define relevant seats for corresponding reference elements (7, 8; 41-46, 50, 51) having substantially cylindrical lateral surfaces, and further holes (2, 3; 47), perpendicular to the preceding holes, for housing relevant locking devices (14, 15, 17, 18), these locking devices being adapted to clamp portions of said lateral surfaces against portions of these seats.

7. A master part according to claim 1, wherein said support structure defines grooves (58-60) with substantially flat walls, for defining seats for reference elements (54-56) having flat surfaces adapted for cooperating with said walls of the grooves.

8. A master part according to claim 1, wherein said support structure (1; 31) is defined by an internal body.

9. A master part according to claim 1, wherein said reference elements (7, 8) comprise support portions (9, 10) and inserts (11-13), the inserts defining said precision machined surfaces.

10. A master part according to claim 9, wherein said inserts (11-13) are made of corrosion resistant material.

11. A process for manufacturing master parts relating to a plurality of critical features, such as linear dimensions, and shape and geometry features, of a determined workpiece (30), said critical features relating to a three dimensional space, comprising the steps of:

manufacturing a substantially integral support structure (1; 31) with a multiplicity of seats (4; 33—38, 58-60) arranged depending on said features and the shape of the workpiece;

manufacturing reference elements (7, 8; 41-46, 50, 51, 54-14 57) adapted to define reference zones with precision machines surfaces;

inserting said reference elements into relevant seats;

adjusting the reference elements with respect to said seats, along directions corresponding to variations of said critical features, for defining desired values of said critical features; and locking the reference elements to the seats.

12. A process according to claim 11, wherein the adjustment of said reference elements (7, 8; 41-46, 50, 51, 54-57) is made by a three-coordinate measuring machine.

13. A process according to claim 11, wherein said support structure (1; 31) is obtained by a body of a material having hardness lower than that of said reference elements (7, 8; 41-46, 50, 51, 54-57), said body being then plated with another material.

14. A process according to claim 11, wherein said reference elements (7, 8; 41-46, 50, 51, 54-57) are subjected to hardening and annealing heat treatments.

15. A process according to claim 10, wherein locking of the reference elements (7, 8; 41-46, 50, 51, 54-57) into the seats (4; 33-38, 58-60) is performed through mechanical locking devices (14, 15, 17, 18) and adhesives (23-25).

* * * * *

UNITED STATES PATENT AND TRADEMARK OFFICE
CERTIFICATE OF CORRECTION

PATENT NO. : 5,113,592
DATED : May 19, 1992
INVENTOR(S) : Mario POSSATI

It is certified that error appears in the above-identified patent and that said Letters Patent is hereby corrected as shown below:

Column 3, line 39, after "with" the following should be inserted:
--respect to the workpiece and, on the other hand, from the--.

Column 4, line 3, "parallelepiped on" should be
--parallelepipedon--.

Column 5, line 37, after "to" (first occurrence) the following should be inserted: --the plane of FIG. 5. These elements 41-46 and 50,51 are--;

Column 5, lines 45 and 46, "parallelepiped on" should be
--parallelepipedon--.

Column 8, line 9, "54-14 57" should be --54-57--.

Signed and Sealed this

Fourteenth Day of September, 1993

Attest:

BRUCE LEHMAN

*Attesting Officer*      *Commissioner of Patents and Trademarks*